United States Patent [19]

Cull

[11] Patent Number: 5,194,791
[45] Date of Patent: Mar. 16, 1993

[54] COMPLIANT STEREO VISION TARGET

[75] Inventor: Laurence J. Cull, Chesterfield, Mo.

[73] Assignee: McDonnell Douglas Corporation, Long Beach, Calif.

[21] Appl. No.: 554,568

[22] Filed: Jul. 19, 1990

[51] Int. Cl.⁵ .............................................. B25J 15/00
[52] U.S. Cl. .................... 318/568.1; 318/577; 901/47; 901/49; 356/373; 395/94
[58] Field of Search .............................. 318/565-569, 318/570, 571, 578, 579, 580; 901/45-47, 3, 9, 12, 15, 18; 395/94, 93, 80; 356/375, 373; 192/125 A

[56] References Cited

U.S. PATENT DOCUMENTS

| | | | |
|---|---|---|---|
| 4,480,918 | 11/1984 | De Fazio | 356/373 |
| 4,498,776 | 2/1985 | Smith | 356/375 |
| 4,724,301 | 2/1988 | Shibata et al. | 318/577 X |
| 4,724,480 | 2/1988 | Hecker et al. | 901/47 X |
| 4,734,572 | 3/1988 | Gorman | 318/577 X |
| 4,816,727 | 3/1989 | Shepard et al. | 318/568 |
| 4,818,173 | 4/1989 | Khusro | 901/45 X |
| 4,818,174 | 4/1989 | Arpiarian et al. | 901/45 X |
| 4,914,460 | 4/1990 | Caimi et al. | 901/47 X |
| 4,925,360 | 5/1990 | Kato | 901/49 X |
| 4,973,216 | 11/1990 | Domm | 901/47 X |
| 5,033,783 | 7/1991 | Izumi et al. | 901/40 X |
| 5,064,043 | 11/1991 | Macdonald | 192/125 A |
| 5,088,171 | 2/1992 | Suzuki | 901/41 X |

FOREIGN PATENT DOCUMENTS

0245390 5/1987 Fed. Rep. of Germany ........ 901/47

Primary Examiner—Paul Ip
Attorney, Agent, or Firm—Donald E. Stout; Gregory A. Cone; John P. Scholl

[57] ABSTRACT

A compliant device attaching to the end of a robot arm and used in conjunction with a stereo vision system. The compliant device compensating for misalignment error in six degrees of freedom, that is x, y, z, pitch, yaw, and clocking (roll) between the end of the robot arm and a lock-on bushing when the compliant device is being inserted in a lock-on bushing. The compliant device having attached a stereo vision target providing positional feedback on the misalignment error between the lock-on bushing and the final position of the end of the robot arm to the stereo vision system.

31 Claims, 4 Drawing Sheets

COMPLIANT STEREO VISION TARGET

FIELD OF THE INVENTION

This invention pertains to a compliant device which is attached to the end of a robot arm. The compliant device providing positional feedback on a misalignment error between the robot arm and a lock-on bushing to a stereo vision programing system used to touch-up industrial robot programs.

BACKGROUND OF THE INVENTION

This invention works in conjunction with an industrial robot which can be programmed in a touch-up mode by a stereo vision system.

An industrial robot which can perform work on three dimensional objects has an arm which can orientate itself in space with six degrees of freedom, that is, movement in the x, y, z, pitch, yaw and clocking (roll) directions. The end of the robot arm is an end effector where a tool which is to perform the work on a workpiece is attached. An industrial robot must be programmed to bring the tool to the location at which work is to be performed. The robot performs this function by first orientating the robot arms in space to a programmed position, then a sliding mechanism actuates to place the end effector adjacent to the workpiece.

Industrial robots can be initially programmed by two methods. They are on-line programming and off-line programming. In on-line programing, the robot is placed in a teach mode. An operator then manually or by a manually actuated control system manipulates the robot arm to place the working tool or a representation of the working tool in the exact location on the workpiece where work is to be performed. The robot is then instructed to remember that location. The procedure is then repeated for each work location on the workpiece.

In off-line programming, physical drawings, computer designed drawing still on the computer (for example a CAD-CAM system), or the workpiece itself can be used to obtain a mathematical representation of the workpiece from which a program can be written and then programmed into the robot. This method is subject to more error than the first described method but is sufficiently accurate for many applications.

The present invention can be used with either initial programming technique to correct misalignment errors that were present either in the initial programming or errors that occurred after initial operation. The invention is particularly suited to correct misalignment errors that occur with the use of a drill blanket.

One major function of an industrial robot is to drill holes in a three dimensional object. To aid the robot in this function and to prevent damage to the workpiece, a drill blanket is used. The drill blanket contains bushings where the holes are to be drilled. An industrial robot is programmed to locate these bushings and place the tool so that it mates with the bushing. Because some drill operations take long periods of time, a more economic use of the robot can be made by having the robot place a drill at a specific location, the drill which contains a locking mechanism then will lock onto a bushing which has locking arms called an earlock. A bushing of this type is called a lock-on bushing. The robot will then direct the end effector to release the drill and go to a second location to pick up a second drill and move it to a third location. By this method, a robot arm can manipulate several drills over the workpiece.

Industrial Robots should ideally be able to place a tool in the exact location that work is to be performed, however this is not always possible. Industrial robots can use tools that are compliant, that is, able to compensate for some misalignment between the end position of the end effector and the bushing location. However, if the misalignment is great, the tool can not compensate for the misalignment and the tool, the workpiece, or the robot could be damaged because the end effector will continue to move toward the workpiece until it has completed its stroke.

Some industrial robot systems have the ability to place the robot in a touch-up mode to correct for misalignment. One form of a touch-up system uses a stereo vision system which comprises a stereo vision target, stereo vision cameras, and a program which can calculate the amount of misalignment.

A prior art stereo vision system operates as follows. Stereo vision cameras are placed on the end effector of the robot arm. The drill is removed to prevent damage due to the misalignment and the industrial robot is placed in the touch-up mode. The robot is then instructed to simulate the insertion of a tool in a bushing location. The robot arm first orientates itself in space in six degrees of freedom, then actuates the end effector with the stereo cameras mounted on it to move toward the bushing. The end effector then pauses at the end of the stroke.

The touch-up misalignment measurement continues with a workman now entering the working envelope of the robot and manually inserting a stereo vision target in the proper bushing. The stereo vision target has a pattern on its top which can be interpreted by the stereo vision system to give the exact orientation of the bushing to the input of the stereo vision system. The stereo vision system cameras mounted on the end effector then take a view of the stereo vision target for input into the stereo vision calculation system. The manually inserted stereo vision target when viewed by the stereo vision system provides an exact indication of the bushing orientation in the x, y, z, pitch, yaw and clocking (roll) direction to the final stroke position of the end effector. The stereo vision system compares this view with a preprogrammed representation of what a stereo vision target would appear like if the end effector was properly oriented with the bushing to insert a drill in that bushing.

The touch-up computer program can then take the difference between what is seen and what is required and adjust the programmed instructions for movement of the robot arm. The robot is then instructed to again cycle through a stroke and another comparison is made. If the misalignment is corrected, the next bushing location is then checked for proper alignment.

The touch-up mode is used when a robot has been working with a program that has worked well in the past, but because a workpiece or tool has been modified or the robot arm has been offset due to a collision, it is necessary to correct for misalignment. The use of a touch-up program is also common when a new program is generated off-line and is first implemented on a robot.

A prior art touch-up program normally will only be concerned with misalignment in five degrees or freedom, that is, misalignment in the x, y, z, pitch and yaw directions if the tool does not have to lock on to a bushing. However proper alignment in the clocking (roll)

direction is critical if the industrial robot is used to place lock-on tools on the workpiece.

Because of the geometry of the lock-on bushing and the nature of the engaging mechanism on the tool, there are two possible problems with misalignment of the tool in the clocking direction. The locking mechanism on the bushing, that is the earlock, is located on the perimeter of the bushing with arms that extend above and partially over the bushing. The earlock engaging mechanism on a drill protrudes from each side and if misaligned in the clocking direction could encounter the top surface of the earlock as the drill begins insertion in the bushing. This will prevent full insertion of the drill and could damage the robot arm because the robot will continue to exert force until it has completed its stroke.

A more common problem occurs when the engaging mechanism on the drill does not engage the earlock because the engaging mechanism can only rotate (clock) a few degrees. The drill, upon insertion, must be oriented at the proper clocking location in order for the drill engaging mechanism, in its limited range of rotation (clocking) to lock the drill to the earlock. An accurate indication of the amount of clocking necessary to engage a tool to a lock-on bushing can be difficult to obtain when off-line programing is done since the earlock, which is located on the perimeter of the bushing, is not uniformly orientated throughout the three dimensional space as defined by the drill blanket. Even when on-line programing is done, it may be difficult to maintain the same clocking at each bushing from one workpiece to another since a different drill blanket may be used or, through handling the drill blanket, an earlock position could have been moved.

The use of a stereo vision system with a stereo vision target has made it possible to correct for misalignment errors in a touch-up mode as discussed above. However, touching up a robot program is time consuming since manual insertion of the stereo vision target is required for each bushing that requires the touch-up. Manual insertion is necessary because prior art does not teach how a stereo vision target which is to measure six degrees of misalignment direction (x, y, z, pitch, yaw and clocking) can be inserted by an end effector which is misaligned with a bushing, and also provide positional information to a stereo vision system.

The manual process can also be dangerous, since, in an effort to speed the process, a workman may stay within the working envelope of the robot arm. In addition, due to the slowness of the operation with the constant stop and start of the robot, inherent errors creep into the process. For example, the robot arm will not be operating within its normal parameters of its moving parts because these elements will not have time to reach and maintain their actual operating conditions for temperature and vibration.

There is another problem with current touch-up programing methods when vision targets are manually placed in a bushing. If the bushing is not a lock-on bushing, the vision target is held in place by a workman as each measurement is made by the stereo vision system and then removed so that the robot can stroke to determine if the new calculated position will cure the misalignment. If a workman does not hold the vision target correctly in the bushing over a series of measurement, an error will result that may go undetected until the robot is actually placed in operation. A form of this problem can also occur when a lock-on bushing is used. Even though the earlock on the bushing is used to secure the target, because a person is constantly removing the vision target to test the stroke and replacing it t recheck the misalignment, the workman in contact with the drill blanket could move it. This would throw off previously corrected program instructions.

SUMMARY OF THE PRESENT INVENTION

The device disclosed herein will enable a touch-up program, which requires positional information from a stereo vision target on misalignment in six degrees of motion, to be run on an industrial robot without the necessity of manually inserting a stereo vision target in each bushing. The described invention can be installed on the end effector of a robot arm which has a misalignment error between an end effector and a bushing. The compliance of the invention will compensate for misalignment errors, which under normal circumstances would result in damage to the robot arm if a tool were in its place. The present invention in its preferred embodiment can compensate for misalignment in six degrees of freedom, that is, in the x, y, z. pitch, yaw, and clocking (roll) direction to ensure proper mating with the bushing.

The invention will also, upon insertion in a bushing, provide a unique and true solution to the total amount of positional misalignment in the x, y, z, pitch, yaw and clocking (roll) directions between the end effector and the bushing so that the stereo vision system and touch-up program can correct for the misalignment.

This device will allow touch-up programing to be completed more quickly and without the danger of having a worker within the operating envelope of a robot arm. Without human intervention in the touch-up process, the information provided by the vision target to the stereo vision system will be more uniform and without the concern of a workman possibly disturbing bushings which have been previously calibrated.

The ability to perform the touch-up program quickly without the necessity to deenergize the robot for safety reasons or to leave the robot arm inoperable for long periods of time when the vision target is manually moved will ensure that the robot arm is operating more closely to its normal operating range for temperature and vibration, reducing inherent errors in the touch-up process.

The presently preferred embodiment of the invention also has the capacity to initiate a clocking motion which will provide an exact measurement between the location of an earlock on the perimeter of the bushing and the orientation of the end effector on the robot arm. This will provide assurance during the touch-up mode that in normal operation a tool at the end of a robot arm will be able to engage an earlock upon actuation of the tools rotational locking mechanism.

In the present preferred embodiment, the invention comprises: a stereo vision target; a compliant housing structure which is connected to the robot's end effector; a rod, which passes through the compliant housing structure and has the stereo vision target mounted at the top end, and at the bottom of the rod, a taper member is attached which will mate with the lock-on bushing; and compliance means and clocking compliance means which enable the device to adjust to misalignment in six degrees of freedom.

The invention is connected to the end effector of a robot in place of a tool. The compliant components of the invention installed within the compliant housing structure are restrained from rotational movement by strategically placed pins and component design. The compliant components within the compliant housing structure and outside of the compliant housing structure are also designed so that the they will return to the same centered position after each use of the device to measure misalignment.

When the end effector moves down to insert the taper member into a bushing, the downward force of the end effector will initially place a force upon the rod which is converted to a torquing force by a clocking compliance means to cause the rod to rotate in a clocking (roll) motion. Attached to the rod is an earlock arm which rotates with the rod until it engages an earlock on a bushing which restricts further rod rotation about the clocking plane. The amount of rotation by the rod allowed by the invention is a measure of the clocking distance between the end effector and the earlock.

With the clocking compliance components now restricted from movement and with the continued downward movement of the end effector, the remaining compliance components are released to respond to misalignment in the x, y, pitch and yaw plane to allow the taper member to mate with the bushing. After the taper member has mated, additional compliance occurs to account for misalignment in the z direction.

The stereo vision target mounted on the top end of the rod has followed all compliance adjustments made by the compliant components. Therefore, when the end effector has completed its stroke and the taper member is in a mated position with the bushing, the stereo vision target will present to the stereo vision cameras, also mounted on the end effector, a unique solution to the amount of misalignment between the end effector and the lock-on bushing.

In addition to the presently preferred embodiment, two alternative embodiments are also presented.

For some applications the tool is not attached to a bushing, but held in the bushing by the end effector until the tool has completed its task. In this application, a lock-on bushing is not used, therefore it is not necessary to measure clocking. An alternate embodiment involves removing the clocking compliant components and connecting the rod directly to a compliant component within the housing structure. The compliant components within the compliant housing structure which are prevented from rotation provide to the stereo vision system a measurement of insertion error in five degrees of freedom, that is, the x, y, z, pitch and yaw directions.

In the second alternative embodiment, the presently preferred embodiment is enhanced to prevent the clocking components from rotation until the taper member has achieved sufficient depth in the bushing. This alternative embodiment will allow the operation of the invention over a larger tolerance range for the compliant components to compensate for misalignment. In the presently preferred embodiment, it is possible, if the misalignment is great, for the clocking compliant components to cause rod rotation before the taper member has penetrated deep enough in the bushing for the earlock arm to encounter an earlock.

The delay in the clocking movement of the rod is achieved by the addition of a clocking delay compliant structure that includes a latch pin which mates with the earlock arm to prevent rotation of the rod until the earlock arm is within the earlock structure. The key feature of this clocking delay structure is the placing of the latch pin on the lower surface of a base which is too large to pass through the opening between the arms of an earlock. The downward movement of the end effector pushes the earlock arm downward toward the bushing, separating the earlock arm from the latch pin which is held to the top side of the earlock. Upon release of the earlock arm from the latch pin the rod is free to rotate and the device works the same as the presently preferred embodiment.

OBJECTIVES OF THE INVENTION

It is a broad objective of the present invention to provide a device which will allow touch-up programing of robots which takes workers out of the working envelope of a robot.

It is another broad object to provide a device which will allow a robot system, in conjunction with a stereo vision system, to perform a touch-up program without the aid of a workman to relocate a stereo vision target, allowing more uniformity in the positioning of the stereo vision target.

It is a further object of the present invention to provide a device which is connected to an end effector of an industrial robot that will mate with a bushing on a three dimensional object when there is misalignment between the robot arm and the bushing. The device will be able to adjust to the misalignment by being compliant, that is able to compensate for misalignment, in six degrees of motion, x, y, z, pitch, yaw, and clocking (roll). Further, after insertion, the invention will provide, by means of an attached stereo vision target, positional information to the stereo vision system which will show the amount of misalignment between the present bushing, the bushing locking mechanism (if used), and the end position of the robot arm including the clocking error.

It is another object of the invention to provide a means to touch-up robot programs faster than by previous manual methods In addition, the present invention will reduce inherent errors in the touch-up process. The device will allow touch-up programing to be performed when the robot is operating closer to its normal operating parameters because there will be no reason to deenergize the robot for safety reasons or to delay the operation while the vision target is manually moved as required by prior art.

DETAILED DESCRIPTION OF THE INVENTION

Figures 1, 6:
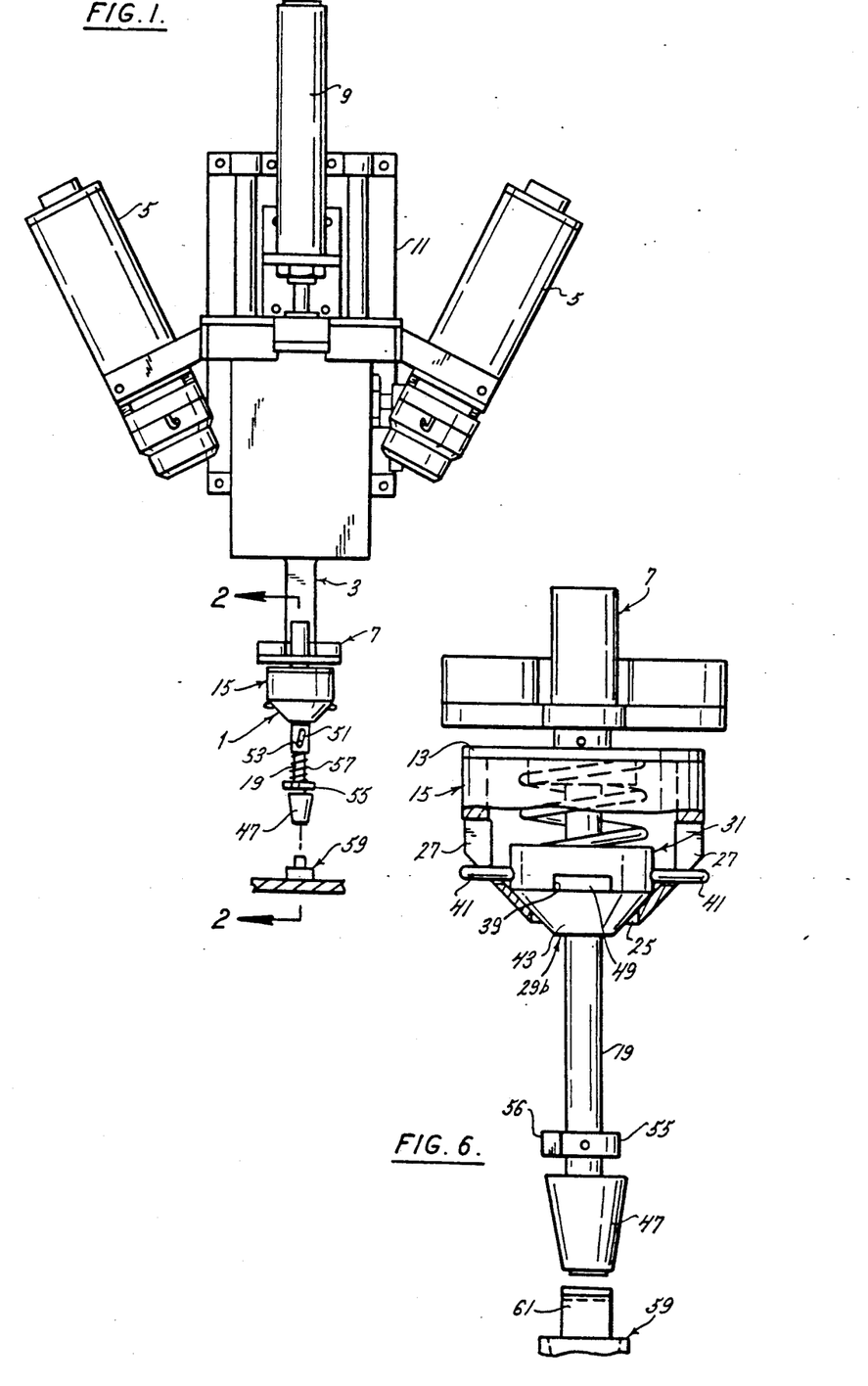
FIG. 1 is a an elevation view of the present invention mounted on the end effector of a robot with stereo vision cameras.
FIG. 6 is a partial cross-sectional view of a first alternative embodiment.

Reference is made to FIG. 1 where the invention 1 is shown connected to an end effector 3 of an industrial robot. Also connected to the end effector are stereo vision cameras 5 which input images of a stereo vision target 7 mounted on the invention 1 to a stereo vision system (not shown). The end effector 3 is moveable up and dow in this case by an end effector movement system 9 and a sliding mechanism 11.

In the following description, references to a coordinate system to describe movement of the referenced invention and the compliant components within the invention are in relation to the position of a lock-on bushing with respect to the end effector. Internal movement of the referenced invention's components in the x, y, z, pitch, yaw and clocking (roll) planes is depicted on FIG. 2 and FIG. 3.

Figure 2:
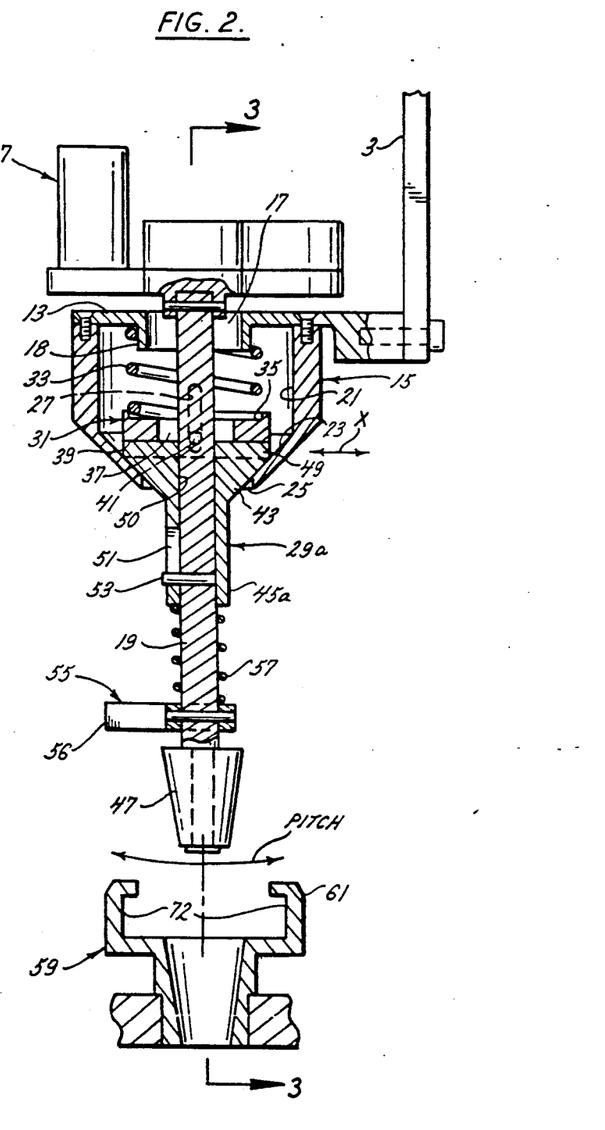
FIG. 2 is a side partial cross-sectional view of the present invention in a rest position and a front view of a lock-on bushing taken at line 2—2 from FIG. 1.

A side partial cut away view of the preferred embodiment is shown is FIG. 2. A front partial cutaway view is shown in FIG. 3 and an exploded view of the individual components is shown in FIG. 4.

Referring to FIG. 2, it is shown that a top member 13 of a compliant housing structure 15 is connected to the end effector 3. FIG. 4 shows that the top member 13 has a central hole 17 which is substantially larger than a rod 19 with a circular cross section which passes through it. Shown in FIG. 3, surrounding the central hole 17 on the lower side, is a built up portion to serve as a spring guide 18.

Figure 4:
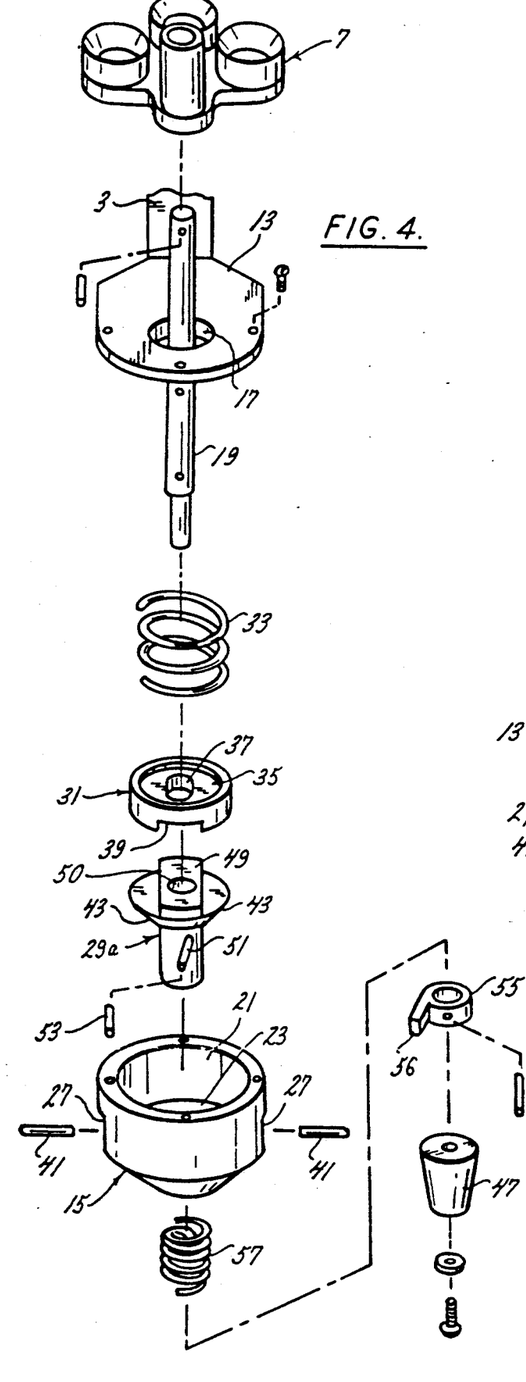
FIG. 4 is an exploded view of the present invention.

The compliant housing structure 15 is shown in FIG. 2 and FIG. 4 as having an interior cylindrical wall 21 which tapers down to form a cone shaped lower interior surface 23 which terminates in a bottom central hole 25 that is substantially the same diameter as the top member hole 17. Cut through the cylindrical wall 21 are vertical slots 27, as shown in FIG. 2. The vertical slots 27 are located opposite to each other on the cylindrical wall 21 90 degrees from the connection to the end effector 3 in this embodiment. Other connection locations between the end effector 3 and the housing structure 15 may be used, in any case, the vertical slots 27 will define the y plane.

Figure 3:
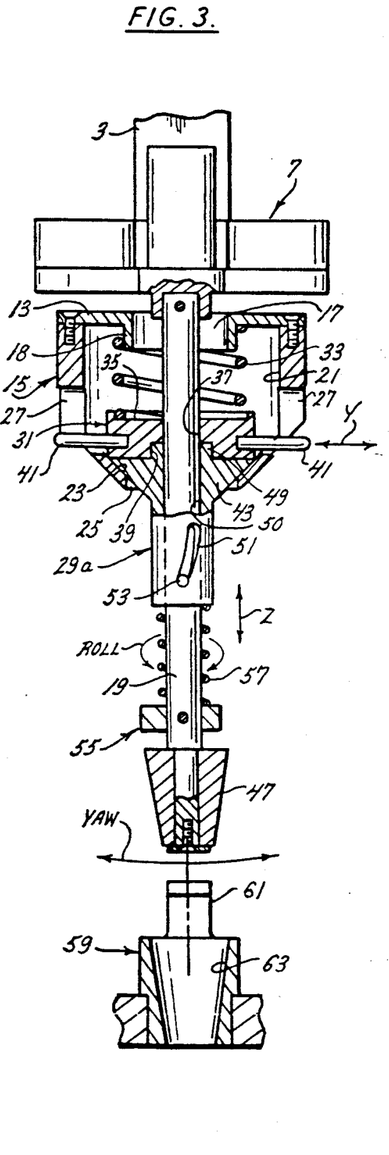
FIG. 3 is a front partial cross-sectional view of the present invention in a rest position and a side view of a lock-on bushing taken at line 3—3 from FIG. 2.

Within the compliant housing structure 15, as shown in FIG. 2 and FIG. 3, are located a major portion of an X-compliant component 29a, a Y-compliant component 31, and a Z-compliant flexure member, which in this preferred embodiment is a first spring 33.

The Y-compliant component 31 as shown in FIG. 4 is in the form of a disk with a circular depression 35 in the top surface for the first spring 33 to rest. The diameter of the depression 35 is substantially the same as the compressed diameter of the first spring 33. The uncompressed diameter of the first spring 33 is substantially the same as the outside diameter of the ring guide 18 on the top member 13.

A center slot 37 is cut through the disk 31 which allows the rod 19 to pass through and to move back and forth along the center slot 37. The width of the center slot 37 is substantially the same as the diameter of the rod 19. On the bottom surface of the disk 31 a rectangular notch 39 is cut across the diameter. The top surface of the rectangular notch 39 encompasses the center slot 37 cut through the disk 31. The center slot 37 and the rectangular notch 39 are aligned within the compliant housing structure 15 to run in the same direction, that is, along the x plane.

Attached to the Y-compliant component 31 on each side of the disk 31 are yaw and pitch pins 41, as shown in FIG. 3. The yaw and pitch pins 41 are located on the disk 31 90 degrees from the orientation of the center slot 37 and the rectangular notch 39. The yaw and pitch pins 41 extend through the vertical slots 27 on the cylindrical wall 21 of the compliant housing structure 15, as shown in FIG. 3, and the diameter of the pins 41 are substantially the same as the width of the vertical slots 27. The pins 41 prevent the Y-compliant component 31 from rotating in a clocking (roll) direction. In addition, the yaw and pitch pins 41 restrict the Y-compliant component 31 to side-to-side movement along the y axis, and to up and down movement to the limits of the vertical slots 27. The Y-compliant component 31 rests upon the X-compliant component 29a as depicted in FIG. 3.

Referring to FIG. 2, the X-compliant component 29a is shaped like an inverted cone 43 with a sleeve extension 45a in place of the cone tip. The base of the cone 43 is flat with a rectangular protrusion 49 which mates with the rectangular notch 39 on the Y-compliant component 31. The rectangular protrusion 49 mated with the rectangular notch 39 allows the X-compliant component 29a to slide in relation to the Y-compliant component 31 in the x-direction.

Through the center of the X-compliant component 29a from top to bottom is a hole 50, shown on FIG. 4, which has substantially the same diameter as the rod 19. Cut through a wall of the sleeve extension 45a is a vertical spiral slot 51. In FIG. 2 and FIG. 3, it is shown that the sleeve extension 45a extends below the bottom hole 25 of the compliant housing structure 15 and has an exterior cross-sectional area substantially less that the cross-sectional area of the bottom hole 15.

Referring to FIG. 3, it is shown that the diameter of the Y-compliant component 31 and the base diameter of the cone section 43 of the X-compliant component 29a are equal with the Y-compliant component 31 resting exactly upon the X-compliant component 29a when in a rest position with the lower edge of the Y-compliant disk 31 touching the cone shaped interior lower surface 23. Further, FIG. 3 also shows that the pitch and yaw pins 41 attached to the Y-compliant component 31 do not rest upon the lower edge of the vertical slots 27 in the compliant housing structure 15, therefore they do not have any effect on the rest position of the Y-compliant component 31. It is also shown on FIG. 3 that the slope of the cone section 43 of the X-compliant component 29a and the slope of the cone shaped lower interior surface 23 of the compliant housing structure 15 are equal over the area at which the X-compliant component 29a rests. Consequently the X-compliant component 29a mates with and is restricted from lateral movement when in its rest position adjacent to the cone shaped lower interior surface 23.

The above structure allows the rod 19 to automatically recenter after being moved. FIG. 3 shows that the first spring 33 exerts a bias force between the top member 13 of the compliant housing structure 15 and the Y-compliant component 31 to force the Y-compliant component to rest upon the X-compliant component 29a. If a force is exerted to cause the X-compliant and Y-compliant component to move from their rest position, upon removal of that force, the bias force of the first spring 33 will again assert itself to push the X-compliant component down along the cone shaped lower surface 23 of the compliant housing structure 15 until the X-compliant component 29a again rests in its mated position with the cone shaped lower surface. The Y-compliant component, which is under the same bias force of the first spring, will follow the X-compliant component to its neutral rest position directly on top of the X-compliant component 29a, with the lower edge of the disk adjacent to the cone shaped lower surface 23 of the complaint housing structure 15.

In the above embodiment, the Y-compliant component is recentered with the aid of both the cone shaped lower surface 23 and the movement of the x-compliant component 29a. The rectangular protrusion 49 of the X-compliant component 29a mating with the rectangular notch 39 of the Y-compliant component 31 forces the Y-compliant component 31 back to its normal rest position. Therefore, it is possible to provide a recentering method for this invention in which only the X-compliant component will interact with the lower tapered surface 23 in the housing structure 15. The Y-compliant component 31 could have a cross sectional area that is substantially larger or smaller than the adjacent surface of the X-compliant component 29a because the recentering mechanism for the Y-compliant component 31 would be the force produced by the X-compliant component 29a alone as it returned to its normal rest position.

Referring to FIG. 4 it is shown that the rod 19 has a stereo vision target 7 mounted on its top end. The rod 19 passes through the top member hole 17, the first spring 33, the Y-compliant component 31, the X-compliant component 29a, and the bottom hole 25 of the compliant housing structure 15. The rod 19 is not attached directly to either the Y-compliant component or the X-compliant component in this currently preferred embodiment.

Attached to a point on the rod 19, which lies within the sleeve extension 45a is a coupling pin 53 that extends through the vertical spiral slot 51 as shown in FIG. 3.

Referring to FIG. 4, at the lower end of the rod 19, the circular cross section is reduced for the attachment of a taper member 47. The taper member 47 must mate exactly with a bushing 63 which is depicted in FIG. 2. The taper member 47 can be changed to accommodate various size bushings 63.

Again referring to FIG. 4, above the taper member 47, an earlock arm 55 is attached. The earlock arm has a circular platform which surrounds the rod and a projection 56 which extends from the circular platform at a right angle to the rod 19. As can be seen in FIG. 2, where a lock-on bushing 59 is depicted with an earlock 61 mounted on a bushing 63, the length of the projection 56 is greater than the radius of the earlock 61.

Also Shown on FIG. 2, between the earlock arm 55 and the lower surface of the sleeve extension 45a is a clocking compliant flexure member which in the preferred embodiment is a second spring 57. The second spring 57 exerts a bias between the lower surface of the sleeve extension 45a and the earlock arm 55 to force the rod 19 to move downward to maintain the coupling pin 53 at the lower end of the vertical spiral slot 51. The second spring 57 is weaker than the first spring 33, consequently upon application of force on the rod in an upward direction (z direction), the second spring 57 will compress before first spring 33 starts to compress.

With the robot placed in the touch-up mode, the stereo vision cameras 5 and the invention 1 mounted on the end effector 3, the invention 1 will operate as follows. Referring to FIG. 1, first a robot will position an end effector 3 to its programmed position in space. The end effector movement system 9 will then be actuated to move the invention 1 attached to the end effector 3 in the z direction along a sliding mechanism 11.

In the following discussion, parts of a lock-on bushing 59 will be referenced to illustrations which appear in FIG. 2, which contains a front view of a lock-on bushing, and FIG. 3, which contains a side view of a lock-on bushing.

Assuming that there is no misalignment in the x, y, pitch or yaw direction between a lock-on bushing 59 and the end effector 3, the following will occur. Prior to the start, the invention has been automatically aligned due to the self centering nature of the inventions components, as explained above, so that the taper member 47 on the rod represents the position that the mating portion of a lock-on tool would have if it were installed on the end effector.

The downward motion of the end effector causes the invention 1 to enter the lock-on bushing 59 without striking the side of the bushing 63 and the taper member 47 will come to rest at the bottom of the bushing 63.

The rod 19 can no longer move in the z direction, the compliant components and flexures of the invention must now compensate for the continued downward movement of the compliant housing structure 15 until the end effector completes its stroke. Initially, the second spring 57 will start to compress since it is the weaker spring allowing the X-compliant 29a and the Y-compliant 31 components, due to the stronger bias of the first spring 33, to continue to move downward with the compliant housing structure 15. The X-compliant component 29a and the Y-compliant component 31 can continue downward because the rod is not attached to either component. The sleeve extension 45a by way of the vertical spiral slot 51 exerts a downward force on the coupling pin 53. This will cause the coupling pin 53 attached to the rod to exert a rotating motion of the rod 19 in a clocking (roll) direction. As the rod turns, the X-compliant component 29a and Y-compliant component 31 can move down the rod 19. The earlock arm 55 attached to the rod 19 will rotate with the rod until it encounters an earlock 61, then the rotation will stop and the compression of second spring 57 will also stop. At this point, the stereo vision target 7, mounted at the top of the rod and which has rotated with the rod 19, will provide a true indication of the clocking position of the earlock in relation to the end effector.

Figure 5:
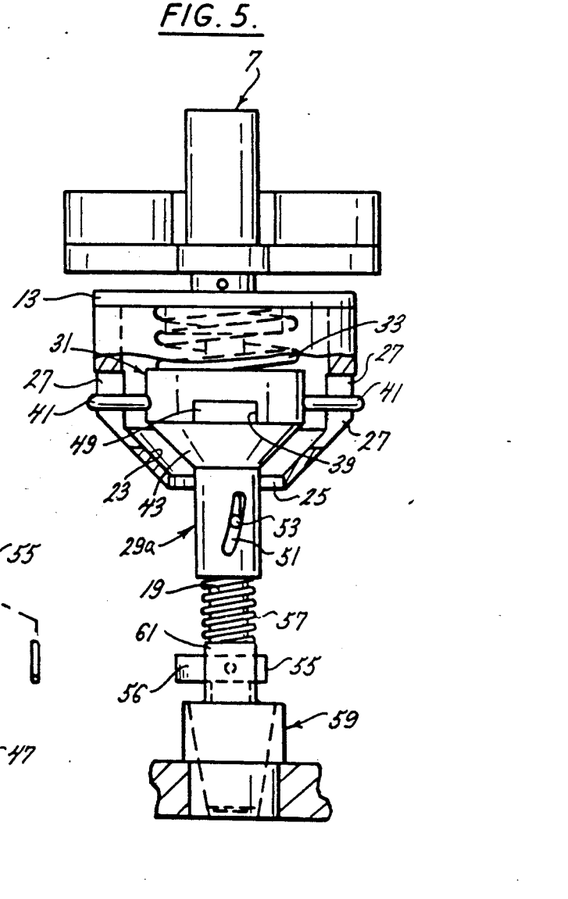
FIG. 5 is front partial cross-sectional view of the present invention with the X-compliant component and the Y-compliant component in a float position.

When the earlock arm 55 encounters an earlock 61 and stops rotation of the rod 19, the end effector 3 is still pushing the compliant housing structure 15 downward. Since the sleeve extension 45a can no longer move downward along the spiral slot 51, the downward force of the end effector can now over come the bias force of the first spring 33 to cause it to compress. The first spring 33 is compressed between the presently fixed position of the Y-compliant component 31 and the downward moving top member 13 of the compliant housing structure. The cone shaped interior surface 23 of the compliant housing structure 15 in moving downward away from the X-complaint component 29a leaves the X-compliant 29a and Y-compliant 31 components in a float condition, as shown in FIG. 5, where they are no longer confined to the cone shaped interior surface 23. In addition, the vertical slots 27 on the compliant housing structure 15 have also moved downward which results in the pitch and yaw pins 41 attached to the Y-compliant component 31 being located in a more central portion of the vertical slots 27. The final position of the floating components with respect to the compliant housing structure 15 in this example will be determined by the final stroke position of the end effector 3 and they will remain in that float position until the end effector 3 retracts the invention 1 from the lock-on bushing 59.

In the foregoing example the rod 19 has rotated in the clocking direction and the X-compliant component 29a and the Y-compliant component 31 have moved in the z direction. However, since there was no misalignment in the x, y, pitch or yaw direction in the above example, there is no relative movement away from the relative rest position of the X-compliant or Y-compliant components within the compliant housing structure 15 in the x, y, pitch or yaw direction. The stereo vision cameras 5 will take a view of the stereo vision target 7 at this point for input into the stereo vision system. This image will be compared to a predetermined representation in the program of a perfectly aligned stereo vision target 7. If there is no indicated misalignment, the robot will go to the next lock-on bushing.

If there is misalignment between the end effector 3 and the lock-on bushing 59 in the x, y, pitch or yaw direction, the following will occur. When the taper member 47 enters the bushing 63, the taper member 47 will engage the side of the bushing 63 and stop. Since the rod's 19 downward motion is stopped, the second spring 57 will start to compress with the resulting rotation of the rod 19 as discussed above. The earlock arm 55, when rotated in the clocking direction, will strike the side of the top portion of the earlock 61. The rod will then stop rotating.

Assuming that the misalignment is in the x direction only, the following will occur. Since the rod 19 is stopped at the side of the bushing 63 and the X-compliant component 29a and the Y-compliant component 31 are prevented from further downward movement along the coupling pin 53, the first spring 33 will start to compress. As the first spring 33 compresses, the X-compliant component 29a will not be confined by the cone shaped lower surface 23 and will float within the compliant housing structure 15. It will be free to slide with respect to the Y-compliant component 31 to compensate for the misalignment in the x direction.

The Y-compliant component 31 can not move in the x direction because it is restrained by the pitch and yaw pins 41 which protrude through the compliant housing structure 15, but the Y-compliant component 31 will remain adjacent to the X-compliant component 29a due to the bias force of the first spring 33. The rod 19 is able to move in the x direction with respect to the Y-compliant component 31 because it can slide along the central slot 37 cut through the Y-compliant component 31.

The sliding movement of X-compliant component 29a will allow the first spring 33 to drive the taper member 47 deeper into the bushing 63. The combined movement of the X-compliant component 29a in the x direction and downward will stop when the X-compliant component 29a again encounters the cone shaped lower surface 23. The cycle will then continue to repeat itself until the taper member 47 is firmly seated in the bushing 63.

As the taper member 47 moves deeper into the bushing the earlock arm 55 mounted to the rod 19 will slide down the side of the earlock with the bias force of the second spring 55 holding the earlock arm adjacent to the earlock 61.

If the misalignment is in the y direction, the Y-compliant component 31 and the X-compliant component 29a, held together by the bias exerted by the first spring, will move in the y misalignment direction in the same cycle as described above until the taper member 47 is firmly seated in the bushing 63. The pitch and yaw pins 41 which extend through the vertical slots 27 of the compliant housing structure 15 allow the X-compliant component and the Y-compliant component to move together in the y plane.

If the misalignment is in the pitch direction, the X-compliant component and the Y-compliant component will tilt in the pitch direction about the center line established by the pitch and yaw pins 41.

If the misalignment is in the yaw direction, the X-compliant component and the Y-compliant component will tilt in the yaw direction about a center line which is perpendicular to the plane established by the vertical slots 27 within the compliant housing structure. The tilt will be established by the pitch and yaw pins 41 moving up or down along the vertical slots 27 on the compliant housing structure.

If there is misalignment in the z direction, it will be compensated for by the continued compression of the first spring 33, after the taper member 47 is mated with the bushing 63, until the end effector reaches the end of its stroke.

Although compensation for misalignment has been discussed individually, it is possible for the invention to compensate for misalignment in all six degrees of motion in one stroke of the end effector. Since the stereo vision target 7 which is mounted to the top of the rod 19 moves the same amount as the taper member 47 at the bottom of the rod 19, the location of the stereo vision target at the end of the stroke provides to the stereo vision system a unique solution to the amount of misalignment between the end effector and the lock-on bushing in six degrees movement.

In some applications it may not be necessary to measure the amount of clocking (roll) between the programmed insertion point of the end effector 3 and the location of the earlock 61 on the perimeter of the bushing 63, as shown in the above embodiment. When an earlock is not attached to a bushing, it is not necessary to measure the clocking error. It will then only be necessary to measure the misalignment error in the x, y, z, pitch, and yaw directions. The invention can be altered in the following manner as a first alternative embodiment, shown in FIG. 6, to measure the above identified misalignment errors.

The Y-compliant component 31 and the first spring 33 remain the same, however the X-compliant component 29b is modified such that the sleeve extension is removed and the rod 19 is connected directly to the X-compliant component 29b. The connection method can be solder, welding, pin, screws or any equivalent. In addition, the second spring 55 is removed in this first alternative embodiment.

Upon insertion of the taper member 47 into the bushing, the rod 19 can not rotate. It is restrained from rotation by the pitch and yaw pins 41 connected to the Y-compliant component 31 which extend through the vertical slots 27 of the compliant housing structure 15, as shown in FIG. 6. Since the X-compliant component 29b is mated to with the Y-compliant component 31 by a rectangular slot 39 and the bias force of the first spring 33, with the Y-compliant disk 31 prevented from rotation, it is not possible for the rod 19 connected directly to the X-compliant component 29b to rotate upon insertion. This alternative embodiment will operate as described in the above currently preferred embodiment to compensate for misalignment in the x, y, z, pitch and yaw direction and, upon insertion in the bushing, it will provide information to the stereo vision system not only of the misalignment between the bushing 63 and the end effector 3, but also the clocking position of the end effector 3 upon insertion of the invention, rather than a measurement of the clocking movement between the insertion point and an earlock 61 as provided by the presently preferred embodiment.

For some applications a second alternative embodiment may be useful. The second alternative embodiment will allow the invention to operate over a wider misalignment tolerance range than would be possible by use of the above presently preferred embodiment. A problem arises when there is a large misalignment error, that is, the taper member 47 strikes the top inside edge of the bushing 63. Referring again to FIG. 2, since the second spring 57 will compress before the first spring will compress, the rod 19 will rotate before the taper member 47 is deep into the bushing 63. Because, the first spring 33 can not compress until after rod 19 rotation takes place, the X-compliant 29a and the Y-compliant 31 components can not respond to a misalignment between the taper member 47 and the bushing 63. Therefore, it is possible, if the misalignment is great, for the earlock arm to rotate in a clocking direction at a point too high to engage the earlock 61. Although it is still possible for the invention to mate with the bushing 63 after the earlock arm 55 has passed over the earlock, the stereo vision target will not provide the correct information on the clocking error.

Figures 7, 8:
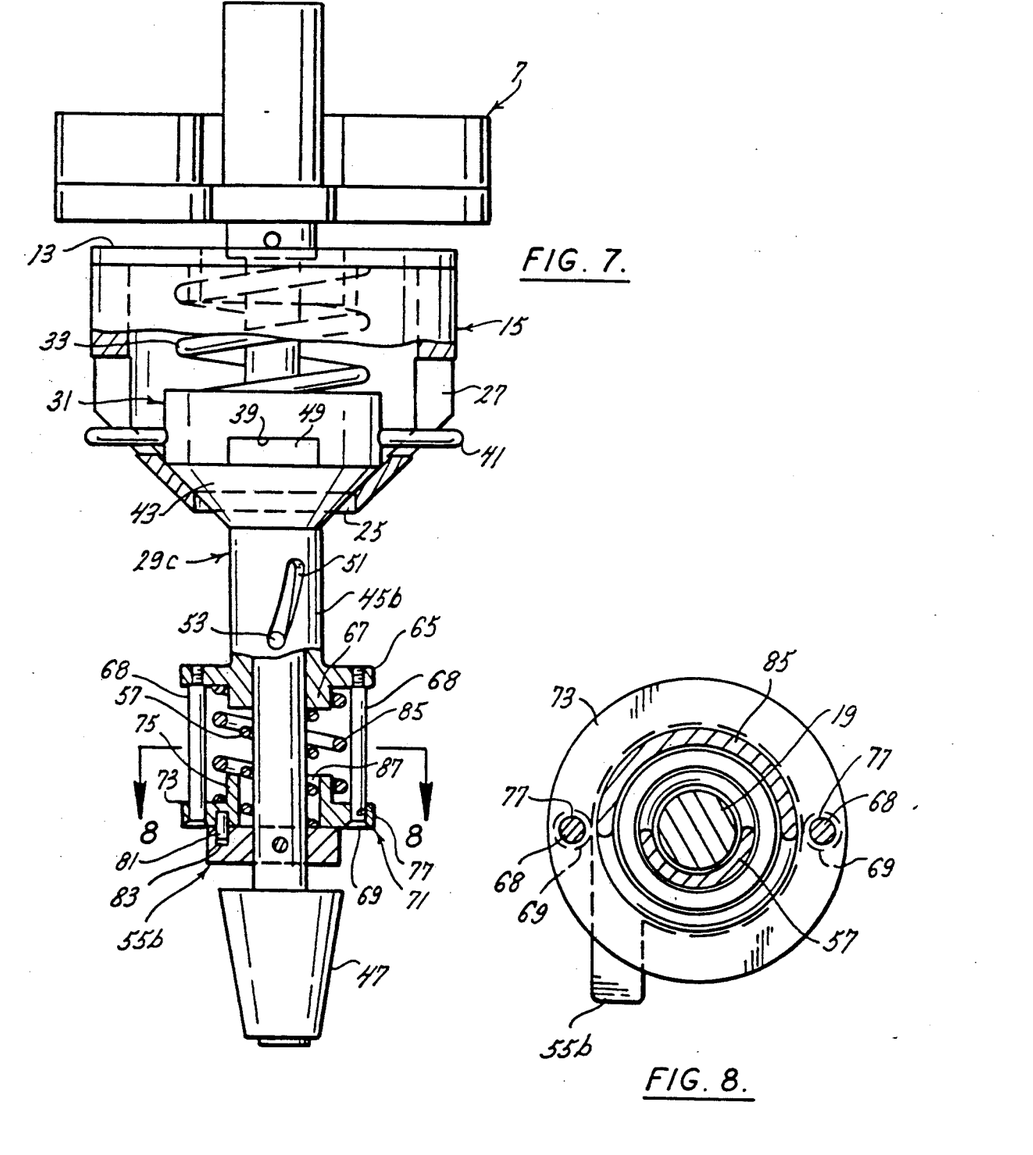
FIG. 7 is a front cross-sectional of a second alternate embodiment of the present invention.
FIG. 8 is a cross-sectional view of the second alternate embodiment taken at section 8—8 of FIG. 7.

The second alternative embodiment reduces the possibility of this occurrence by the addition of components to the currently preferred embodiment, as shown in FIG. 7, which will delay the rotation of the rod 19 in the clocking direction until the taper member 47 has sufficiently penetrated deep enough within the bushing 63 to ensure that the earlock arm 55b will engage an earlock 61. In the second alternative embodiment, provision is made for the X-compliant component 29c and the Y-compliant component 31 to reach a float position within the compliant housing structure 15 and then adjust for misalignment before the rod 19 starts to rotate in a clocking direction.

FIG. 7, shows how a sleeve extension 45b is modified for this embodiment. A first cincture 65 and a second cincture 67 are attached to the lower end of the sleeve extension 45b.

Referring to FIG. 7, two guide rods 68 are shown. Each guide rod 68 having two ends, an upper end and a lower end. The upper end of the two guide rods 68 is attached to the lower side of the first cincture 65. The guide rods 68 are located on opposite sides of the first cincture 65. The lower end of the guide rods have a counter-sunk heads 69. The guide rods 68 extend downward to engage a slidable base 71.

The slidable base 71, as shown in FIG. 7 and FIG. 8, has a circular base plate 73. The base plate 73 has a diameter that is substantially larger then the distance between two facing arms 72 of an earlock 61 as shown in FIG. 2. The size of the base plate 73 will allow the base plate 73 to rest upon the top of an earlock 61.

Again referring to FIG. 7, the slidable base has a circular projection 75 which is attached and centrally located above the base plate 73. In addition, a latch pin 81 is attached to the lower side of the base plate 73.

Rod guide holes 77 are located on opposite sides of the base plate 73. The rod guide holes 77 slidably engage the guide rods 68. The slidable base 71 is prevented from sliding off of the rod guides 68 by cutting the rod guide holes 77 to accommodate counter-sunk heads 69 on the rod guides 68. The end result is a slidable base 71 which can rise up along the guide rods 68 and in a rest position not slide off of the guide rods 68. In addition, in the rest position, the base plate 73 presents a substantially flat lower surface, except where the latch pin 81 is attached to the lower surface.

With the invention in a rest position, the latch pin 81 due to the bias force of a third flexure member, in this case a third spring 85, will engage a latch hole 83 cut into the ear lock arm 55b shown in FIG. 7.

The third spring 85, as shown in FIG. 7, is installed between the movable base 71 and the second cincture 67. The third spring 85 has a bias force substantially less than the bias force of the second spring 57, and the combined bias force of the third spring 85 and the second spring 57 is substantially less than the bias force of the first spring 33. The circular protrusion 75 on the movable base 71 acts as guide for the lower end of the third spring 85, with the second cincture 67 acting as a spring guide for the upper end of the third spring 85. The outer diameter of the circular protrusion 75 and the outer diameter of the second cincture 67 are substantially the same and equal to the inner diameter of the third spring 85 in an uncompressed state. The distance between the attachment points of the guide rods 68 on the first cincture 65 and the distance between the rod guide holes 77 in the slidable base 71 is substantially the same as the compressed outer diameter of the third spring 85.

In addition, the circular protrusion 75 has a centrally located hole 87 cut from top to bottom through the slidable base 71. The inner diameter of the hole 87 is substantially the same as the compressed outer diameter of the second spring 57.

FIG. 8 provides a cross sectional view of the placement of spring components above the slidable base 71 taken at the section 8—8 of FIG. 7.

The second alternative embodiment will function as follows. If there is gross misalignment, the taper member 47 will engage the bushing 63 on the inner surface near the top, there the downward motion of the rod 19 will stop. Unlike the present preferred embodiment discussed above, the second spring 57, as shown in FIG. 7, can not compress because the rod 19 is prevented from rotation by the latch pin 81 engaged in the earlock arm 83. Since the end effector 3 continues to descend, the first spring 33 has to compress allowing the compliant housing structure 15 to continue downward. This places the X-compliant component 29c and the Y-compliant component 31 into a float position which will allow the components to move a small amount to respond to the misalignment before being restrained by the cone shaped lower interior surface 23. However even a small movement of the X-compliant component in the desired direction will allow the taper member 47 to penetrate deeper into the bushing 63 under the bias force of the first spring 33. Then the process will begin again, that is, the first spring 33 will compress allowing the X-compliant component 29c to move further in the misaligned direction, the taper member 47 will penetrate deeper in the bushing 63.

As the taper member penetrates to a sufficient depth in the bushing 63, the earlock arm 55b attached to the rod will move past the top surface of the earlock 61 and the lower surface of the movable base 71 will strike the upper surface of the earlock 61. The continued downward movement of the taper member 47 and the earlock arm will result in the earlock arm 55b moving away from the bottom surface of the movable base 71 causing the latch pin 81 to separate from the latch pin hole 83 in the earlock arm 55b.

The downward movement of the rod 19 will now stop because the second spring 57 is now free to compress. The second spring 57 is weaker than the first spring, therefore the X-compliant component 29c and the Y-compliant component 31 under the bias force of the first spring 33 can move down on the rod 19. This downward movement, past the coupling pin 53, forces the rod 19 to rotate. When the earlock arm engages an earlock 61, the rotation of the rod 19 stops. Without rod rotation, the second spring 57 can no longer compress and the downward force of the end effector 3 will again be applied to the first spring 33. The first spring will start to compress to compensate for the continued downward movement of the end effector 3. The X-compliant component 29c and the Y-compliant 31 will then be able to move to compensate for the remaining misalignment as discussed earlier.

At this time, the rod guides 68 will start to slide downward through the rod guide holes 77 on the movable base 71 which is resting on top of the earlock 61. The third spring 85 will also start to compress to allow this sliding movement. The sliding movement will stop when the taper member 47 is seated in the bushing 63 because the sleeve extension 45c of the X-compliant component 29c can no longer move downward.

After the taper member 47 has reached the bottom of the bushing 63, that is, after the X-compliant component 29c and the Y-compliant component 31 have moved within the housing structure to compensate for the misalignment in the x, y, yaw and pitch direction, the end effector will still be moving downward with the first spring 33 continuing to compress to compensate for z compliance.

After the misalignment is measured by the stereo vision system, the second alternative embodiment recenters for the next insertion in the following way. As the invention is being retracted, since the first spring 33 exerts the largest bias force, the X-compliant component 29c and the Y-compliant component 31 will start to recenter within the compliant housing structure 15 as soon as the end effector 3 begins removal of the invention from the bushing 63 and will complete the recentering process as soon as the taper member 47 is lifted from contact with the bushing 63. As the taper member 47 clears the bushing 63, the second spring 57 will exert a force to push the coupling pin 53 down along the vertical spiral slot 51 to return the coupling pin 53 to the lower end of the vertical spiral slot 51. This will cause the rod 19 to rotate in a clocking direction in the reverse of the earlier direction to return the earlock arm 55b to its initial rest position. Finally, as the earlock arm 55b rises through the earlock 61, the bias force of the third spring 85 will push the movable base toward the earlock arm 55b and the latch pin 81 will mate with the latch hole 83 on the earlock arm 55b.

A detailed description has been provided for three embodiments of this invention. It should be noted at this point that due to the nature of the invention, since flexures must be compressed for proper operation, that the tip of the taper member 47 on the invention must extend beyond the normal bushing mating portion of a tool. The total that the tip of the invention must exceed the bushing mating portion of the tool will be determined by the geometry of the manufactured invention, but this additional length must be enough for the second spring 57 to fully compress and for the first spring 33 to compress enough to ensure that the compliant components within the compliant housing structure 15 will be able to obtain a float position at the end of the robot stroke. In converting from a manual stereo vision target placement system to this invention, care should be taken to ensure that the rod 19 on which the stereo vision target 7 is mounted in this invention is the same length as the rod used with the manual stereo vision target, or that the touch-up program is rewritten to compensate for this difference in rod length.

The operation of each embodiment can be enhanced by the use of materials which have low coefficients of friction between the contact surfaces. It is also understood that modifications of the invention will become apparent to those skilled in the art and that these deviations are to be construed as part of the present invention.

What is claimed is:

1. A compliant apparatus for use in touch-up programming of an industrial robot which uses a stereo vision system, the apparatus automatically compensating for a positional misalignment in the x, y, z, pitch and yaw directions between the robot arm and a workpiece mounted bushing, the apparatus comprising:

a stereo vision target;
   a taper member dimensioned to mate with the bushing;
   a rod having first and second ends, said stereo vision target being mounted to said first end and said taper member being connected to said second end;
   compliant means coupled to said rod between said first and second ends for allowing said rod to move in x, y, z, yaw and pitch directions relative to the robot arm, and including:
   rod recentering means coupled to said rod for restoring said rod to an initial rest position upon disengaging said taper member from the bushing, and for compensating for misalignment error between the robot arm and the bushing in the z direction;
   Y-compliant means coupled to said rod for allowing said rod to move in a y plane, and rotate in a yaw and a pitch direction to compensate for misalignment error relative to the robot arm; and
   X-compliant means coupled to said rod for allowing said rod to move in an x plane to compensate for misalignment error relative to the robot arm; and
   connection means coupled to said compliant means for attaching said compliant means to the robot arm.

2. The compliant apparatus according to claim 1, wherein said rod centering means includes:

a housing structure having a tapered interior bottom surface with a bottom central hole through which said second end of said rod extends, said bottom hole having an area substantially larger than the cross sectional area of said rod, said housing structure also having a top member with a top central hole through which said first end of said rod extends, said top hole having substantially the same area as said bottom hole;

an X-compliant component located within said housing structure having a tapered portion, said tapered portion having the same slope as said tapered interior bottom surface, said X-compliant component aligning and mating with said tapered interior bottom surface when said X-compliant component is in a rest position, said X-compliant component also having a central hole disposed along the center point of said tapered portion, said central hole having a cross sectional area substantially the same as the cross sectional area of said rod, said rod passing through said central hole, said rod attached to said X-compliant component within said central hole; and a Z-compliant biasing means coupled between said housing structure and X-compliant component for forcing said X-compliant component to a mated position with said tapered interior bottom surface when said taper member is disengaging from the bushing, for allowing movement of said tapered interior bottom surface away from said X-compliant component when the robot arm is inserting said taper member into the bushing, and for compensating for misalignment between the robot arm and the bushing in the z direction after said taper member is inserted into the bushing.

3. The compliant apparatus according to claim 1, wherein said X-compliant means includes:

a housing structure having an enclosing wall with two opposite vertical slots disposed in said enclosing wall, said vertical slots defining the y plane, said housing structure also having a top member with a top central hole through which said first end of said rod extends, said top hole having an area substantially larger that the cross sectional area of said rod, and a bottom surface with a bottom central hole through which said second end of said rod extends, said bottom hole having an area substantially the same as said top hole;

an X-compliant component located within said housing structure, said X-compliant component having a flat upper surface with a cross sectional area substantially less than the cross sectional area between said enclosing wall, said flat upper surface having a projection above and across said flat upper surface, said X-compliant component also having a central hole disposed along the center point of said flat surface and said projection down through said X-compliant component, said central hole having a cross sectional area substantially the same as the cross sectional area of said rod, said rod extending through said central hole, said rod attaching to said X-compliant component within said central hole;

a Y-compliant component disposed within said housing structure having a top surface, a bottom flat surface and two opposite sides, said Y-compliant component having a cross sectional area substantially less than the cross sectional area between said enclosing wall and having a center slot extending from said top surface to said bottom surface, said center slot having a width substantially the same as the width of said rod, said bottom flat surface having a bottom notch disposed in and across said flat surface encompassing said center slot, said bottom notch being complementary to said projection of said X-compliant component, said -compliant component being located above and adjacent to said X-compliant component with said bottom notch and said projection mated, whereby said X-compliant component being slidable relative to said Y-compliant component along said bottom notch and said rod being movable along the plane established by said center slot of said Y-compliant component; and two yaw and pitch pins being attached to said two opposite sides of said Y-compliant component at points 90 degrees from alignment of said notch on said bottom flat surface, said yaw and pitch pins extending through said vertical slots.

4. The compliant apparatus according to claim 1, wherein said Y-compliant means includes:

a housing structure having an enclosing wall with two opposite vertical slots disposed in said enclosing wall, said vertical slots defining the y plane, said housing structure also having a top member with a top central hole through which said first end of said rod extends, said top hole having an area substantially larger that the cross sectional area of said rod, and a bottom surface with a bottom central hole through which said second end of said rod extends, said bottom hole having an area substantially the same as said top hole;

an X-compliant component disposed within said housing structure, said X-compliant component having a flat upper surface with a cross sectional area substantially less than the cross sectional area between said enclosing wall, said flat upper surface having a projection above and across said flat upper surface, said X-compliant component also having a central hole disposed along the center point of said flat surface and said projection down through said X-compliant component, said central hole having a cross sectional area substantially the same as the cross sectional area of said rod, said rod extending through said central hole, said rod attaching to said X-compliant component within said central hole;

a Y-compliant component disposed within said housing structure having a top surface, a bottom flat surface and two opposite sides, said Y-compliant component having a cross sectional area substantially less than the cross sectional area between said enclosing wall and having a center slot extending from said top surface to said bottom surface, said center slot having a width substantially the same as the width of said rod, said bottom flat surface having a bottom notch disposed in and across said flat surface encompassing said center slot, said bottom notch being complementary to said projection of said X-compliant component, said Y-compliant component being located above and adjacent to said X-compliant component with said bottom notch and said projection mated; and two yaw and pitch pins being attached to said two opposite sides of said Y-compliant component at points 90 degrees from alignment of said notch on said bottom flat surface, said yaw and pitch pins extending through said vertical slots, whereby said Y-compliant component and said X-compliant component being movable move together along the plane established by said vertical slots, and rotatable together in the pitch direction along the axis established by said pitch and yaw pins and in the yaw direction along the axis established by movement of said yaw and pitch pins up and down within said vertical slots.

5. A compliant apparatus for use in touch-up programming of an industrial robot which uses a stereo vision system, the apparatus automatically compensating for a positional misalignment in the x, y, z, pitch and yaw directions between the robot arm and a workpiece mounted bushing, the apparatus comprising:

a stereo vision target;

a taper member dimensioned to mate with the bushing;

a rod having first and second ends, said stereo vision target being mounted to said first end and said taper member being connected to said second end;

compliant means coupled to said rod between said first and second ends for allowing said rod to move in x, y, z, yaw and pitch directions relative to the robot arm, and including:

a housing structure having a tapered interior bottom surface, an enclosing wall and a top member, said tapered interior bottom surface having a bottom central hole through which said second end of said rod extends, said bottom hole having an area substantially larger than the cross sectional area of said rod, said top member having a top central hole through which said first end of said rod extends, said top hole having substantially the same area as said bottom hole, said enclosing wall having two opposite vertical slots disposed in said enclosing wall, said vertical slots defining the y plane;

an X-compliant component located within said housing structure having a tapered portion and a flat upper surface, said tapered portion having the same slope as said tapered interior bottom surface, said X-compliant component aligning and mating with said tapered interior bottom surface when said X-compliant component is in a rest position, said flat upper surface having a cross sectional area substantially less than the cross sectional area between said enclosing wall, said flat upper surface having a projection above and across said flat upper surface, said X-compliant component also having a central hole disposed along the center point of said flat surface, said projection and said tapered portion, down through said X-compliant component, said central hole having a cross sectional area substantially the same as the cross sectional area of said rod, said rod extending through said central hole, said rod attaching to said X-compliant component within said central hole;

a Y-compliant component disposed within said housing structure having a top surface, a bottom flat surface and two opposite sides, said Y-compliant component having a cross sectional area substantially less than the cross sectional area between said enclosing wall and having a center slot extending from said to surface to said bottom surface, said center slot having a width substantially the same as the width of said rod, said bottom flat surface having a bottom notch disposed in and across said flat surface encompassing said center slot, said bottom notch being complementary to said projection of said X-compliant component, said Y-compliant component being located above and adjacent to said X-compliant component with said bottom notch and said projection mated;

two yaw and pitch pins being attached to said two opposite sides of said Y-compliant component at points 90 degrees from alignment of said notch on said bottom flat surface, said yaw and pitch pins extending through said vertical slots; and Z-compliant biasing means coupled between said housing structure and said X-compliant component for exerting a constant force to push said X-compliant component to a mated position with said tapered interior bottom surface and allow said X-compliant component and said Y-compliant component to assume a float position within said housing structure when said Z-compliant biasing force is exceeded; and connection means coupled to said compliant means for attaching said compliant means to the robot arm.

6. The compliant apparatus according to claim 1, wherein said Z-compliant biasing means includes:

a first flexure member exerting a bias force between said top member of said housing and said top surface of said Y-compliant component.

7. The compliant apparatus according to claim 1, wherein said first flexure member being a first spring.

8. The compliant apparatus according to claim 5, wherein said enclosing wall being a cylindrical wall; wherein said tapered interior bottom surface includes an inverted cone shaped surface; wherein said tapered portion of said X-compliant component has an inverted cone shape, and said flat upper surface includes a circular perimeter; and wherein said Y-compliant component has a disk shape, said disk having a diameter substantially the same as the diameter of said flat upper surface of said X-compliant component.

9. The compliant apparatus according to claim 7, further comprising:

a top member first spring guide attached and encompassing the lower side of said top central hole of said top member;

a depression disposed in said top surface of said Y-compliant component forming a first spring guide; and a first spring, said first spring being located between said top member first spring guide and said depression.

10. A Compliant apparatus for use in touch-up programing of an industrial robot which uses a stereo vision system, the apparatus automatically compensating for a positional misalignment in the x, y, z, pitch, yaw and clocking directions between the robot arm and a workpiece mounted bushing and an earlock, the apparatus comprising:

a stereo vision target;

a taper member dimensioned to mate with the bushing;

a rod having a circular cross section and first and second ends, said stereo vision target being mounted to said first end, and said taper member being connected to said second end;

compliant means coupled to said rod between said first and second ends for allowing said rod to move in x, y, z, yaw and pitch directions relative to the robot arm;

clocking means coupled to said rod between said first and second ends for allowing said rod movement in a clocking direction relative to the robot arm; and connection means coupled to said compliant means for attaching said compliant means to the robot arm.

11. The compliant apparatus according to claim 10, wherein said compliant means includes:
   rod recentering means coupled to said rod for restoring said rod to an initial rest position upon disengaging said taper member from the bushing, and for compensating for misalignment error between the robot arm and the bushing in the z direction;
   Y-compliant means coupled to said rod for allowing said rod to move in a y plane, and rotate in a yaw and a pitch direction to compensate for misalignment error relative to the robot arm; and
   X-compliant means coupled to said rod for allowing said rod to move in an x plane to compensate for misalignment error relative to the robot arm.

12. The compliant apparatus according to claim 11, wherein said rod centering means includes:
   a housing structure having a tapered interior bottom surface with a bottom central circular hole through which said second end of said rod extends, said bottom hole having an area substantially larger than the cross sectional area of said rod, said housing structure also having a top member with a top central circular hole through which said first end of said rod extends, said top hole having substantially the same area as said bottom hole;
   an X-compliant component located within said housing structure having a tapered portion, said tapered portion having the same slope as said tapered interior bottom surface, said X-compliant component aligning and mating with said tapered interior bottom surface when said X-compliant component is in a rest position, said X-compliant component also having a central circular hole disposed along the center point of said tapered portion, said central circular hole having a cross sectional area substantially the same as the cross sectional area of said rod, said rod passing through said central circular hole, said rod attached to said X-compliant component within said central circular hole; and
   a Z-compliant biasing means coupled between said housing structure and X-compliant component for forcing said X-compliant component to a mated position with said tapered interior bottom surface when said taper member is disengaging from the bushing, for allowing movement of said tapered interior bottom surface away from said X-compliant component when the robot arm is inserting said taper member into the bushing, and for compensating for misalignment between the robot arm and the bushing in the z direction after said taper member is inserted into the bushing.

13. The compliant apparatus according to claim 11, wherein said X-compliant means includes:
   a housing structure having an enclosing wall with two opposite vertical slots disposed in said enclosing wall, said vertical slots defining the y plane, said housing structure also having a top member with a top central hole through which said first end of said rod extends, said top hole having an area substantially larger that the cross sectional area of said rod, and a bottom surface with a bottom central hole through which said second end of said rod extends, said bottom hole having an area substantially the same as said top hole;
   an X-compliant component located within said housing structure, said X-compliant component having a flat upper surface with a cross sectional area substantially less than the cross sectional area between said enclosing wall, said flat upper surface having a projection above and across said flat upper surface, said X-compliant component also having a central circular hole disposed along the center point of said flat surface and said projection down through said X-compliant component, said central circular hole having a cross sectional area substantially the same as the cross sectional area of said rod, said rod extending through said central circular hole, said rod attaching to said X-compliant component within said central circular hole;
   a Y-compliant component disposed within said housing structure having a top surface, a bottom flat surface and two opposite sides, said Y-compliant component having a cross sectional area substantially less than the cross sectional area between said enclosing wall and having a center slot extending from said top surface to said bottom surface, said center slot having a width substantially the same as the width of said rod, said bottom flat surface having a bottom notch disposed in and across said flat surface encompassing said center slot, said bottom notch being complementary to said projection of said X-compliant component, said Y-compliant component being located above and adjacent to said X-compliant component with said bottom notch and said projection mated, whereby said X-compliant component being slidable relative to said Y-compliant component along said bottom notch and said rod being movable along the plane established by said center slot of said Y-compliant component; and
   two yaw and pitch pins being attached to said two opposite sides of said Y-compliant component at points 90 degrees from alignment of said notch on said bottom flat surface, said yaw and pitch pins extending through said vertical slots.

14. The compliant apparatus according to claim 11, wherein said Y-compliant means includes:
   a housing structure having an enclosing wall with two opposite vertical slots disposed in said enclosing wall, said vertical slots defining the y plane, said housing structure also having a top member with a top central hole through which said first end of said rod extends, said top hole having an area substantially larger that the cross sectional area of said rod, and a bottom surface with a bottom central hole through which said second end of said rod extends, said bottom hole having an area substantially the same as said top hole;
   an X-compliant component disposed within said housing structure, said X-compliant component having a flat upper surface with a cross sectional area substantially less than the cross sectional area between said enclosing wall, said flat upper surface having a projection above and across said flat upper surface, said X-compliant component also having a central circular hole disposed along the center point of said flat surface and said projection down through said X-compliant component, said central circular hole having a cross sectional area substantially the same as the cross sectional area of said rod, said rod extending through said central circular hole, said rod attaching to said X-compliant component within said central circular hole;
   a Y-compliant component disposed within said housing structure having a top surface, a bottom flat surface and two opposite sides, said Y-compliant component having a cross sectional area substantially less than the cross sectional area between said enclosing wall and having a center slot extending from said top surface to said bottom surface, said center slot having a width substantially the same as the width of said rod, said bottom flat surface having a bottom notch disposed in and across said flat surface encompassing said center slot, said bottom notch being complementary to said projection of said X-compliant component, said Y-compliant component being located above and adjacent to said X-compliant component with said bottom notch and said projection mated; and two yaw and pitch pins being attached to said two opposite sides of said Y-compliant component at points 90 degrees from alignment of said notch on said bottom flat surface, said yaw and pitch pins extending through said vertical slots, whereby said Y-compliant component and said X-compliant component being movable move together along the plane established by said vertical slots, and rotatable together in the pitch direction along the axis established by said pitch and yaw pins and in the yaw direction along the axis established by movement of said yaw and pitch pins up and down within said vertical slots.

15. The compliant apparatus according to claim 10, wherein said compliant means includes:

a housing structure having a tapered interior bottom surface, an enclosing wall and a top member, said tapered interior bottom surface having a bottom central hole through which said second end of said rod extends, said bottom hole having an area substantially larger than the cross sectional area of said rod, said top member having a top central hole through which said first end of said rod extends, said top hole having substantially the same area as said bottom hole, said enclosing wall having two opposite vertical disposed in said enclosing wall, said vertical slots defining the y plane;

an X-compliant component located within said housing structure having a tapered portion and a flat upper surface, said tapered portion having the same slope as said tapered interior bottom surface, said X-compliant component aligning and mating with said tapered interior bottom surface when said X-compliant component is in a rest Position, said flat upper surface having a cross sectional area substantially less than the cross sectional area between said enclosing wall, said flat upper surface having a projection above and across said flat upper surface, said X-compliant component also having a central circular hole disposed along the center point of said flat surface, said projection and said tapered portion, down through said X-compliant component, said central circular hole having a cross sectional area substantially the same as the cross sectional area of said rod, said rod extending through said central circular hole, said rod attaching to said X-compliant component within said central circular hole;

a Y-compliant component disposed within said housing structure having a top surface, a bottom flat surface and two opposite sides, said Y-compliant component having a cross sectional area substantially less than the cross sectional area between said enclosing wall and having a center slot extending from said top surface to said bottom surface, said center slot having a width substantially the same as the width of said rod, said bottom flat surface having a bottom notch disposed in and across said flat surface encompassing said center slot, said bottom notch being complementary to said projection of said X-compliant component, said Y-compliant component being located above and adjacent to said X-compliant component with said bottom notch and said projection mated;

two yaw and pitch pins being attached to said two opposite sides of said Y-compliant component at points 90 degrees from alignment of said notch on said bottom flat surface, said yaw and pitch pins extending through said vertical slots; and Z-compliant biasing means coupled between said housing structure and said X-compliant component for exerting a constant force to push said X-compliant component to a mated position with said tapered interior bottom surface and allow said X-compliant component and said Y-compliant component to assume a float position within said housing structure when said Z-compliant biasing force is exceeded.

16. The compliant apparatus according to claim 15, wherein Z-compliant biasing means includes:

a first flexure member exerting a bias force between said top member of said housing and said top surface of said Y-compliant component.

17. The compliant apparatus according to claim 16, wherein said first flexure member being a first spring.

18. The compliant apparatus as describe in claim 15, wherein:

said enclosing wall is a cylindrical wall; wherein said tapered interior bottom surface includes an inverted cone shaped surface; wherein said tapered portion of said X-compliant component has an inverted cone shape, and said flat upper surface includes a circular perimeter; and wherein said Y-compliant component has a disk shape, said disk having a diameter substantially the same as the diameter of said flat upper surface of said X-compliant component.

19. The compliant apparatus according to claim 17, further comprising:

a top member first spring guide attached and encompassing the lower side of said top central hole of said top member;

a depression disposed in said top surface of said Y-compliant component forming a first spring guide; and a first spring, said first spring being located between said top member first spring guide and said depression.

20. The compliant apparatus according to claim 10, wherein said clocking means includes:

a sleeve having a first and second end and a circular hole extending the length of said sleeve and, said circular hole having a diameter substantially the same the diameter of said rod, said first end of said sleeve being attached to lower end of said compliant means, said rod extending into and passing through said sleeve and said compliant means;

a vertical spiral slot disposed in and through a side of said sleeve;

a coupling pin attached to a portion of said rod within said sleeve, said coupling pin extending through said vertical spiral slot;

an earlock arm attaching to said rod above said taper member having a projection extending at right angles from said rod, said projection having a length greater than the radius of the earlock; and clocking biasing means being coupled between said earlock arm and said second end of said sleeve to apply a constant bias to said rod to force said rod coupling pin toward the lower end of said vertical spiral slot and to maintain said coupling pin at the lower end of said spiral slot when said rod is in a rest position, said clocking biasing means initially responding to a force applied to said taper to initiate a clocking rotation of said rod before said compliant means responds to compensate for misalignment error in the x, y, z, pitch and yaw directions.

21. The compliant apparatus according to claim 20, wherein said clocking biasing means includes:

a second flexure member exerting a bias force between said second end of said sleeve and said earlock arm.

22. The compliant apparatus according to claim 21, wherein said second flexure member is a second spring.

23. The compliant apparatus according to claim 22, wherein said earlock arm has a platform extending from and surrounding said rod which acts as a lower spring guide for said second spring.

24. The compliant apparatus according to claim 15, further comprising:

said X-compliant component includes a sleeve extending below said tapered portion, said sleeve having a first and second end and a circular hole extending the length of said sleeve, said first end of said sleeve attaching to said tapered portion, said circular hole of said sleeve being continuous with and having the same diameter as said central circular hole of said X-compliant component, said sleeve extending through said bottom hole of said housing structure, said sleeve having a cross sectional area substantially less than the cross sectional area of said bottom hole, said rod extending into and passing through said circular hole said sleeve and said central circular hole of said X-compliant component;

a vertical spiral slot disposed in and through a side of said sleeve;

a coupling pin, said coupling pin being attached to a portion of said rod within said sleeve, said coupling pin extending through said vertical spiral slot;

an earlock arm attaching to said rod above said taper member having a projection extending at right angles from rod, said projection having a length greater than the radius of the earlock; and clocking biasing means coupled between said earlock arm and said second end of said sleeve to force said coupling pin to the lower end of said spiral slot when said rod is in a rest position, said clocking biasing means exerting a biasing force on said rod less than said Z-compliant biasing means force on said rod.

25. The compliant apparatus according to claim 24, wherein said clocking biasing means includes:

a second flexure member exerting a bias force between said earlock arm and said second end of said sleeve.

26. The compliant apparatus according to claim 25, wherein said second flexure member is a second spring.

27. The compliant apparatus according to claim 10, further comprising:

clocking delay means coupled to said rod between said first and second end for delaying said clocking means until said tapered end has penetrated the bushing to a sufficient depth for said clocking means to engage an earlock.

28. The compliant apparatus according to claim 24, further comprising:

a first cincture attaching to said sleeve and being located above said second end of said sleeve;

a slidable base having a base plate, said base plate having a cross sectional area greater than the opening in the top of an earlock and also having a central opening through said base plate for said rod and said clocking biasing means to pass through;

a latch pin attached to the lower side of said base plate;

a latch pin hole disposed in the top of said earlock arm;

a clocking delay biasing means coupled between said first cincture and said slidable base exerting a force for engaging said latch pin on said slidable base with said latch pin hole on said earlock arm when said rod is in a rest position and allowing said slidable base to move relative to said earlock arm to release said latch pin from said latch Pin hole when said taper has penetrated deep enough within the bushing for said earlock arm to engage an earlock.

29. The compliant apparatus according to claim 28, wherein said clocking delay biasing means further includes:

a third flexure member attached to and exerting a bias force between said first cincture and said movable base.

30. The compliant apparatus according to claim 29, wherein said third flexure member is a third spring.

31. The compliant apparatus according to claim 28, wherein said clocking delay biasing means further includes:

a third spring having a bias force less than the bias force of said clocking biasing means;

a second cincture attached to said sleeve and located below said first cincture, said second cincture also having a diameter substantially less than the diameter of said first cincture and acting as a top spring guide for said third spring;

a plurality of guide rods having a first and second end, said first end being attached to said lower surface of said first cincture, and said second end of said guide rods extending downward and having a counter-sunk head;

a plurality of rod guide holes disposed on said base plate of said slidable base for slidably engaging said rod guides and being configured to correspond to said counter-sunk heads of said second end of said guide rods; and a bottom spring guide associated with said third spring and located on said slidable base and projecting above and attached to said base plate, said bottom spring guide surrounding said central hole of said base plate, said third spring being disposed intermediate said first cincture and said slidable base, and exerting a bias force between said first cincture and said slidable base.

* * * * *